United States Patent [19]
Arnoldussen et al.

[11] 3,961,760
[45] June 8, 1976

[54] MAGAZINE FOR X-RAY FILM SHEETS, COMPRISING A ROTATABLE STORAGE DRUM

[75] Inventors: Theodorus Franciscus Arnoldussen; Antonius Johannes Ludovicus Maria Hoeks; Norbertus Johannes Josephus Liebrand, all of Eindhoven, Netherlands

[73] Assignee: U.S. Philips Corporation, New York, N.Y.

[22] Filed: Mar. 29, 1974

[21] Appl. No.: 456,375

[30] Foreign Application Priority Data
Apr. 18, 1973 Netherlands.................... 7305412

[52] U.S. Cl............................ 242/67.3 R; 242/71.7
[51] Int. Cl.²......................................... B65H 17/06
[58] Field of Search............ 242/67.3 R, 192, 67.4, 242/67.5, 55, 67.1 R, 197, 199, 200, 71.2, 71.1, 71.7; 352/183; 226/170, 171, 172, 117

[56] References Cited
UNITED STATES PATENTS
1,806,375    5/1931    Tiedeman .................. 352/183 UX
2,374,038    4/1945    Ress ................................. 242/192
3,715,087    2/1973    Schmidt ...................... 242/67.3 R
3,743,200    7/1973    Hommerin .................. 242/67.3 R FOREIGN PATENTS OR APPLICATIONS
313,672    6/1929    United Kingdom................ 242/67.5

*Primary Examiner*—George F. Mautz
*Attorney, Agent, or Firm*—Frank R. Trifari; Ronald L. Drumheller

[57] ABSTRACT

A magazine for taking up and giving off X-ray film sheets, comprising a storage drum which is rotatable about its axis and two flexible belts which extend tangentially from the storage drum to two auxiliary drums such that film sheets can be wrapped about the storage drum by the belts. The auxiliary drums are freely rotatable about a common shaft which is coupled to the storage drum. Each of these auxiliary drums is pretensioned by a helical spring with respect to the common shaft such that the belts are kept taut.

8 Claims, 3 Drawing Figures

MAGAZINE FOR X-RAY FILM SHEETS, COMPRISING A ROTATABLE STORAGE DRUM

The invention relates to a magazine for taking up and giving off X-ray film sheets, comprising a storage drum which is rotatable about its axis and a similar auxiliary drum, and also comprising a flexible belt which tangentially extends from the one to the other drum such that film sheets which are introduced into the magazine via a gap which can be closed so as to be light-tight can be clamped between the belt and the storage drum and can be wrapped about this drum by the belt and, conversely, can be discharged again through the gap upon unwrapping.

In a known embodiment of such a magazine a flexible belt of synthetic material having a width equal to the maximum width of the film sheets (approximately 30 cm) is used. The frequent wrapping and unwrapping of a flexible belt of such a width readily give rise to tensions in the belt, with the result that the belt, which can have a length of, for example, between 4 and 40 meters, tends to "roam", that is to say it is not wrapped onto the wrapping shaft at exactly right angles. It may then occur that the film sheets taken up are discharged in a position shifted in the direction of the drum axes, which is, of course, not permissible.

This problem is solved according to the invention in that use is made of at least two belts and at least two auxiliary drums which are rotatable, independent of each other, about a common axis, each auxiliary drum being coupled to the storage drum by way of at least one resilient element which keeps the belts taut. Due to the use of separate belts which are comparatively narrow and which are kept under approximately the same, substantially constant tensile force by resilient elements, the said problems inherent in the frequent wrapping and unwrapping of a wide belt are substantially eliminated.

Moreover, a narrow belt can be guided even more accurately, if desired, by lateral guides, for example, flanges on the drum.

Another advantage of the invention over the known devices is that for the driving of the belt in two directions, that is to say wrapping it onto the storage drum and the auxiliary drum, no separate motors or coupling need be used, but merely the direction of rotation of the drive motor must be reversed.

The invention will be described in detail hereinafter with reference to the drawing.

FIG. 1 is a perspective view of one embodiment, and the

Figure 1:
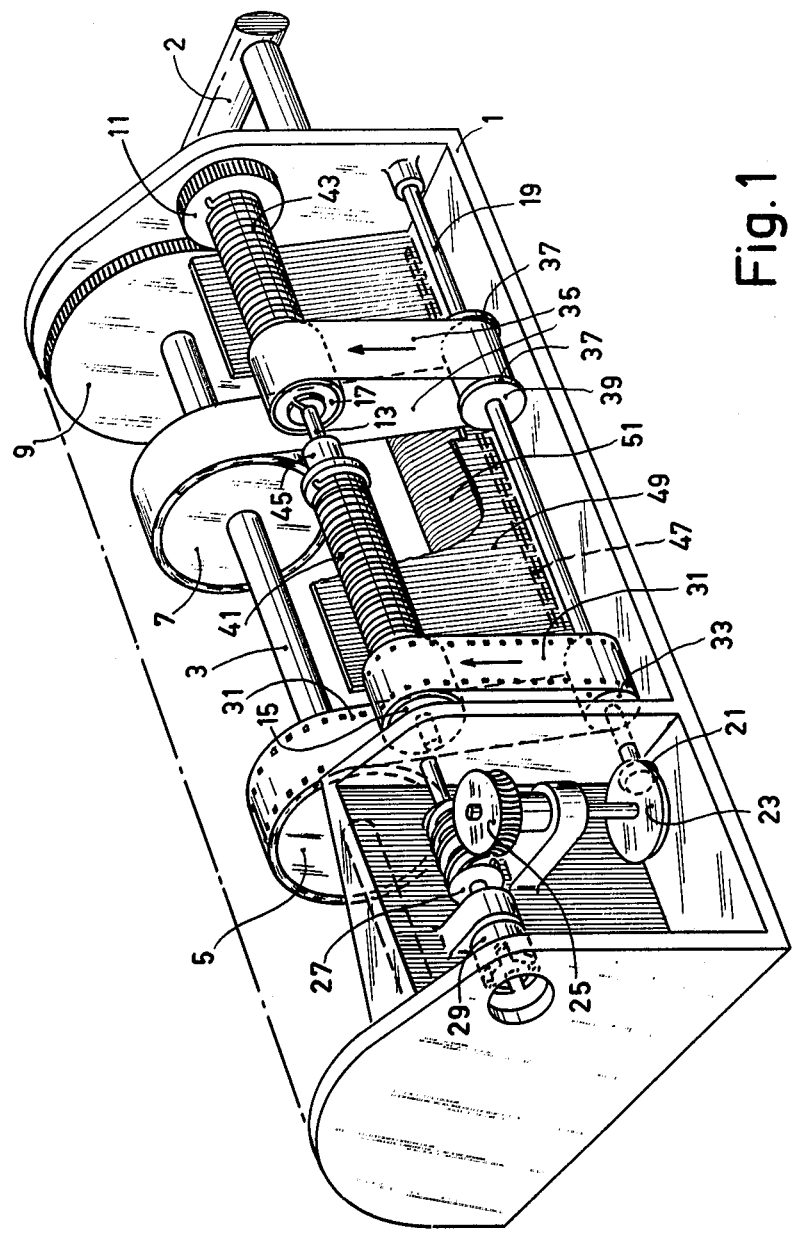

The film magazine shown is a light-tight box, consisting of a base part or container 1 with grip 2 and a cover (removed in the drawing). Arranged to be freely rotatable in the container 1 is a shaft 3 on which a storage drum, in this case constructed as two separate drums 5 and 7, and a gearwheel 9 are secured. The gearwheel 9 engages a gearwheel 11 which is secured on a shaft 13 which is parallel to the shaft 3 and which is also journalled to be freely rotatable. The shaft 13 supports two auxiliary drums 15 and 17 which are freely rotatable with respect thereto but which are not axially displaceable. Also journalled to be rotatable in the container 1 is a third shaft 19 which is parallel to the shafts 3 and 13 and which can be driven from outside the magazine by means of a claw coupling 29 by way of a set of crown wheels 21, 23 and a wormwheel drive 25, 27. All three shafts are locked against axial displacement.

Connected on the drum 5 is a flexible belt 31 which extends from this drum, tangentially and perpendicularly to the direction of the shafts 3 and 13, to the auxiliary drum 15, in the case shown via an intermediate drum 33 which is secured on the shaft 19. The belt 31 may be, for example, a synthetic belt which has a width of 30 mm and which also has perforations which co-operate with corresponding teeth on the drum 33. Similarly connected to the drum 7 is a flexible belt 35 which need not have perforations and which extends to the auxiliary drum 17 via a smooth intermediate drum 39 which is provided with flanges 37 and which is also secured on the shaft 19. Each of the auxiliary drums 15 and 17 is connected to one end of a helical spring 41, 43, respectively, which is coaxially arranged about the shaft 13; the other end of each of these springs is rigidly connected to the shaft 13 via a hub 45 and the gearwheel 11, respectively. The two helical springs 41 and 43 are pre-tensioned such that they keep the belts 31 and 35 taut with respect to the shaft 13 — and hence also with respect to the shaft 3 and the drums 5 and 7 — that is to say, they are pre-tensioned such that an approximately equally large tensile force is exerted on the two belts in the direction of the arrows. The long helical springs 41 and 43 ensure that during the wrapping and unwrapping, in spite of the fact that the transmission ratio between the shafts 3 and 13 continuously changes via the belts and does not remain equal to the transmission ratio of the gearwheels 9 and 11, the tensile force in the two belts 31 and 35 remains substantially constant.

Provided in the bottom of the container 1 is a gap 47 which can be closed so as to be light-tight. After the opening of this gap and the fitting of the light-tight cover (not shown), X-ray film sheets can be introduced into the magazine one after the other, for example, manually in a dark room through the gap 47, the storage drum formed by the two drums 5 and 7 being at the same time rotated counter-clockwise - i.e. in the winding sense of the belts 31 and 35 - by means of the drive unit shown via the belt 31. The film sheets which are inserted through the slot 47 are then guided approximately tangentially to the storage drum by guide plates 49 and 51 and are clamped between the drum and the belts and are subsequently wrapped onto the storage drum. In order to facilitate this operation, the distance between the drums 5 and 7 must, of course, be smaller than the width of the film sheets. The filled magazine with closed gap 47 can then be arranged in an X-ray apparatus which can be provided with a drive unit of known construction which can be connected to the coupling 29 and which serves to discharge the film sheets one after the other from the magazine 1 through the gap 47, which has meanwhile been automatically opened, to the recording position in the X-ray apparatus.

In contrast with the described embodiment, the intermediate shaft 19 with the intermediate drums 33 and 39 might be dispensed with and be replaced by the shaft 13 with the auxiliary drums 15 and 17 which are then directly driven via the drive unit 21–29. The displacement of the belts 31 and 35 per revolution of the driven shaft, however, is then dependent of the quantity of belt already wound on and is, in contrast with the embodiment shown, not constant. In the latter embodiment (compare also FIG. 3) a film counter can be coupled to the intermediate shaft. In another variant, one of the helical springs 41 and 43, for example, the spring 43, is provided, instead of between the gearwheel 11 and the shaft 13 as shown, between the gearwheel 9 and the shaft 3 which in this case must be freely rotatable with respect to the gearwheel 9, whilst the auxiliary drum 17 is arranged to be fixed on the shaft 13. Two resilient elements in series as if it were are then present between the auxiliary drum 15 and the storage drum 5, 7. It is an essential aspect that between the storage drum 5, 7 and each of the auxiliary drums 15 and 17 at least one resilient element is separately present by means of which the belts can be kept under a substantially constant tensile force which is preferably equal for both belts.

It will be obvious that substantially no or only very small differences in tensile force will occur between the two belts in the case of narrow belts in comparison with belts having a width which is ten times as large. Consequently, the "roaming" of the narrow belts 31 and 35 during the wrapping and unwrapping is minimized and substantially negligible and can be completely avoided, if desired, by way of lateral guides for the belt such as, for example, the teeth on the drum 33 and the flanges 37 on the drum 39.

Figure 2:
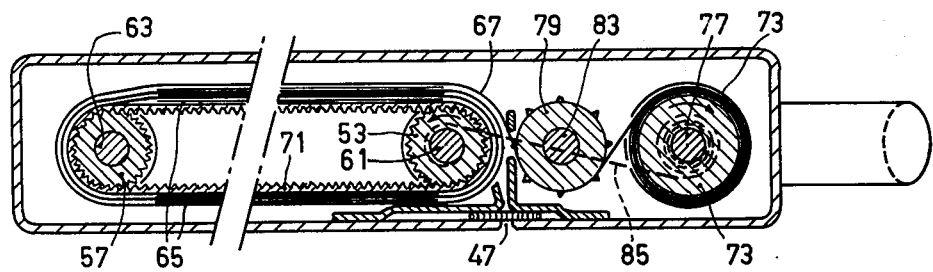
FIGS. 2 and 3 are (partial) sectional views of a second embodiment.
Figure 3:
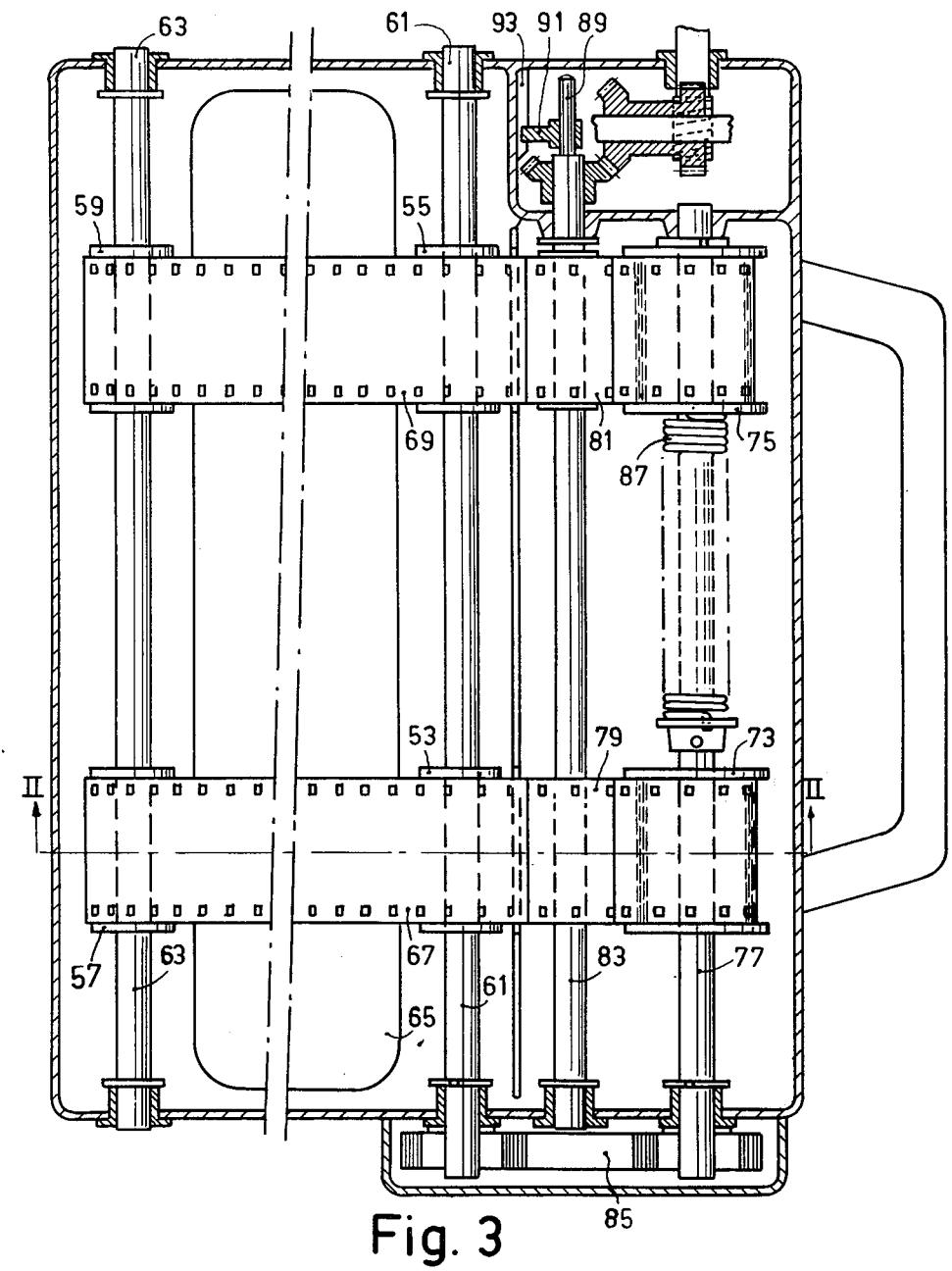

FIGS. 2 and 3 show a variant in which the storage drum consists of four drums 53, 55, 57 and 59 which are mounted in pairs on two parallel shafts 61 and 63, the spacing of which is larger than the maximum length of the film sheets 65 to be accommodated, with the result that these sheets (see FIG. 2) can each time be stored between two drums in the flat position which is desired if storage is undertaken for a prolonged period of time. The shafts 61 and 63 are coupled to each other by endless belts which are guided about each of the two drum pairs 53, 55 and 57, 59, one of the required flexible belts 67, 69, respectively, being connected to each of said endless belts. FIG. 2 shows the toothed belt 71 arranged about the toothed drums 53 and 57, the end of the belt 67 being connected thereto. The further device, comprising the auxiliary drums 73 and 75, associated shaft 77, intermediate drums 79 and 81, and intermediate shaft 83, is in principle identical to that described with reference to FIG. 1. However, the two intermediate drums 79 and 81 in FIG. 3 are provided with teeth by way of example, the drum 81 being freely rotatable about the shaft 83. Furthermore, instead of being coupled by gearwheels, the shafts 61 and 77 are coupled to each other by way of a resilient element in the form of an S-shaped leaf spring 85 (denoted by broken lines in FIG. 2), the ends of which are connected to the shafts 61 and 77 and are wound a few times about these shafts. The spring tends to wind onto the shaft 61 and to unwind from the shaft 77, and is hence pretensioned (compare FIG. 2) so as to keep the belt 67 taut (the auxiliary drum 73 being rigidly connected to the shaft 77). The auxiliary drum 75 is freely rotatable about the shaft 77 and is coupled thereto by way of a helical spring 87 in the same way as shown in FIG. 1. In principle, each of the four shafts 61, 63, 77 or 83 can be driven, for example, the shaft 83 as shown. The latter shaft can be provided on its end which projects outside the light-tight part of the magazine with a screwthread 89, a nut with pointer 91 which is locked against turning and which serves as a film counter being displaceable by the said screwthread.

In the simplest embodiment of this film counter the number of films present in the magazine is indicated on a scale 93. The pointer 91 can alternatively be coupled to a measuring potentiometer and the analog signal to be derived therefrom can be converted, using known means, into a digital indication. It is, of course, also possible to make the pointer 91 drive a device which directly supplies a digital signal; remote indication is feasible in both cases.

What is claimed is:

1. A magazine for taking up and giving off x-ray film sheets, comprising:
    rotatable storage drum means;
    first and second flexible belts attached at one end to said drum means, rotation of said drum means wrapping and unwrapping said belts about said drum means at spaced apart locations;
    first and second independently rotatable auxiliary drums positioned with respect to said storage drum means to take up therefrom and give off thereto said first and second belts respectively;
    first and second resilient elements cooperating with said first and second auxiliary drums respectively for independently applying substantially constant and substantially equal tension to said first and second belts respectively;
    means for rotating said storage drum means; and
    means for guiding film sheets to and from said storage drum means, so that film sheets are taken up and given off by clamping and unclamping thereof about said storage drum means with said wrapping and unwrapping belts.

2. A magazine as defined in claim 1 wherein said first and second resilient elements resiliently couple said first and second auxiliary drums respectively to a common shaft that is rotatively coupled rigidly to said storage drum means.

3. A magazine as defined in claim 2 wherein said resilient elements are helical springs.

4. A magazine as defined in claim 2 and further comprising first and second intermediate drums guiding said first and second belts respectively between said storage drum means and said auxiliary drums, said means for rotating said storage drum means comprising means for coupling in a driving fashion said first intermediate drum to said first belt and means for driving said first intermediate drum.

5. A magazine as defined in claim 4 wherein said second intermediate drum is not coupled in a driving fashion to said second belt.

6. A magazine as defined in claim 4 wherein said first belt has perforations along an edge thereof and said first intermediate drum has teeth for cooperating with said perforations to drive said first belt.

7. A magazine as defined in claim 1 wherein said rotatable storage drum means comprises two axially spaced drums coaxially mounted rigidly on a common shaft for rotation together, each of said axially spaced drums cooperating with one of said belts.

8. A magazine as defined in claim 1 wherein said rotatable storage drum means comprises a plurality of pairs of drums, said pairs of drums being mounted on mutually parallel shafts spaced by more than the maximum longitudinal dimension of stored film sheets, and two endless belts, each wrapped about one of the drums of each pair of drums, said flexible belts being attached respectively to said endless belts.

* * * * *